Patented Apr. 13, 1954

2,675,354

UNITED STATES PATENT OFFICE 2,675,354

METHOD OF PRODUCING GELS

Richard G. McChrystal and Clarence R. Fast, Tulsa, Okla., assignors to Stanolind Oil and Gas Company, Tulsa, Okla., a corporation of Delaware No Drawing. Application May 18, 1950, Serial No. 162,806

17 Claims. (Cl. 252—8.55)

1

The present invention relates to a method for effecting gelation of liquids. More particularly, it pertains to a method for accelerating the gelling time of liquids employed in various hydraulic operations such as, for example, those utilized in the fracturing of underground formations.

In co-pending application U. S. S. N. 29,932 filed May 28, 1948, by J. B. Clark, now Patent No. 2,596,845, a procedure is described for effecting the fracture of an underground formation from which it is desired to produce oil, gas, or various minerals. According to the teachings there disclosed, increased quantities of such substances can be obtained by first locating in the well bore the particular portion of the formation from which it is desired to obtain increased production, and thereafter effect a fracture of the structure to thereby render the oil, gas, or minerals contained therein much more readily recoverable. Broadly this object is accomplished by injecting a viscous oily liquid or gel under pressure into the formation to open up the latter and thereafter reducing the viscosity of the gel while it is in the formation whereby a permeable channel is produced therein to allow fluids to be conducted from the formation into the well bore.

Normally, such gels are prepared by adding a suitable bodying or thickening agent to an oily liquid material such as, for example, crude oil or kerosene. At temperatures not substantially lower than 70 to 75° F. a gel is obtained which possesses properties satisfactory for use as a fracturing fluid.

While the procedure described in the co-pending application referred to above has met with an unusual degree of commercial success, a considerable amount of difficulty has been encountered in the preparation of such fracturing liquids during cold weather. Thus, at temperatures of about 60° F. and below, it is exceedingly difficult to obtain a satisfactory fracturing liquid or gel by known methods. In order to bring about gelation of the liquid at these lower temperatures, the mixture of bodying agent and oily liquid must be heated and continuously stirred. Heating in the field of the relatively large quantities of fracturing liquid required is dangerous because of the fact that a serious fire hazard is created by the use of gasoline, crude oil, or similar mixtures under these conditions. Moreover, such an operation obviously is awkward, expensive, and inconvenient. Also, while the heating of the oily liquid must be resorted to in order to effect proper gelation, it tends to "unbalance" the composition of the liquid by driving off the more volatile components thereof. Although gels can be prepared from the liquids thus heated, they tend to break down at a slower rate after having been injected into the formation owing principally to the substantial absence of the light ends, thus further complicating the hydraulic fracturing operation.

Accordingly, it is an object of our invention to overcome the above as well as other disadvantages encountered in the preparation of such hydraulic fracturing compositions at temperatures below 60° F. by adding to the mixture of oily liquid and bodying agent a substance capable of accelerating the gelation of said mixture in the absence of external heating. It is a further object of our invention to produce satisfactory gels at temperatures of from about 75 to 80° F. from mixtures of a bodying agent and an oily liquid which do not normally gel at temperatures below about 110° F. and to thereby broaden the field of bodying agents available for this purpose.

In carrying out a preferred embodiment of our invention a weighed quantity of oily liquid is mixed with a suitable bodying agent by adding the latter thereto and the resulting mixture occasionally stirred. During the mixing of the oily liquid with the bodying agent, the accelerator is added in a concentration of from about 1 to about 35 volume per cent and stirring is continued until a gel having the desired properties is produced. Normally this operation requires a period of about one-half hour or less. Usually by this time gelation has proceeded to the point at which the viscosity is sufficiently high to maintain in suspension substantially all of the undispersed bodying agent and granular propping material contained therein. This propping material is frequently employed to hold open the cracks or fissures in the formation produced by application of the gel under pressure so that the gas, oil, mineral, or other substances can be recovered and preferably consists of sand (16 mesh) or a similar substance utilized generally in a concentration of from about 0.5 pound to about 10 pounds per gallon of viscous gel. The gel employed in carrying out this fracturing operation should have a viscosity of from at least 30 centipoises to about 5,000 centipoises or higher as determined with the Stormer viscosimeter at 600 R. P. M.; for example, from about 75 to several hundred centipoises is ordinarily preferred. After the ingredients of the gel have been mixed, a suitable fracturing composition having the above-stated viscosity range should be formed within at least three to five hours. In general, with a given gel, its viscosity is effected to a large extent by the temperature of the formation which it is desired to fracture. Formation temperatures may ordinarily range from about 100 to about 210° F., the average temperature usually being in the neighborhood of about 140° F. Such temperature conditions, i. e., about 140° F., normally require gels having bodying agents incorporated therein to the extent of about 5 weight per cent; however, at higher temperatures increased quantities of bodying material should be used and at temperatures of the order of 210° F., the bodying agent should be utilized in a concentration of about 10 weight per cent to yield a gel having the desired characteristics.

While viscosity is in a general sense indicative of the ability of the fracturing fluid to penetrate the formation, the filter rate is a more precise measure of such characteristics and is applicable to fluid suspensions of solids or fluids containing plastering agents. The preferred test of a suitable fracturing fluid, therefore, is the filtrate rate. This factor is customarily defined as the volume of liquid collected in a unit time (normally 30 minutes) when a measured sample of liquid is placed in a cylinder closed at the bottom by a supported filter paper and a gas pressure exerted on the surface of such liquid. Hydraulic compositions normally regarded as satisfactory for fracturing formations of the type herein contemplated should exhibit a fluid loss, or filtrate rate, under these circumstances, of 100 cc. or less, preferably 50 cc. or less, in 30 minutes as determined in accordance with the apparatus and procedure described in API Code No. 29, 2nd edition, July 1942 (tentative). A gel having the above properties can be injected under pressure into the formation to produce the desired fracture. In connection with the invention described and claimed herein, the expression "fracturing gel," which appears in the present specification, is intended to refer to a gel having the characteristics enumerated immediately above.

By the addition of a gel accelerator, in accordance with our invention, heating to bring about gelation of the mixture is eliminated. In addition, through the use of a gel accelerator we are now able to employ bodying agents which were heretofore considered impractical owing to the relatively high temperatures the resulting mixtures had to be heated in order that gels might be formed.

In general, the metal salts of fatty acids constitute suitable bodying agents for producing a satisfactory fracturing composition when mixed with an appropriate oily liquid. The expression "bodying agent" as used herein is intended to refer to a material which tends to thicken the oily liquid employed and thereby reduce substantially its filtrate rate. Metallic soaps such as, for example, an aluminum soap bodying agent which has the ability to form hydrocarbon gels readily at ordinary temperatures, may be employed. A suitable soap of this type is made from two distinct components. The first component consists of a saturated fatty acid soap such as aluminum laurate which is present in the bodying agent to the extent of about 50 per cent. This component is a relatively high melting solid which, by itself, produces thin and unstable gels. The second component is a combination of aluminum soaps derived from cycloaliphatic and unsaturated aliphatic acids, i. e., an aluminum naphthenate, aluminum oleate, aluminum linoleate, or the like. Two of these soaps, such as an aluminum naphthenate and aluminum oleate, are combined in substantially equal proportions with aluminum laurate to produce a preferred type of bodying agent of distinctive and superior properties not found in its individual components. Gelation ordinarily occurs in from about 15 seconds to about 2 hours; gels having a suitable filtrate rate and viscosity are produced within from 30 seconds to about 3 hours. Normally, from about 0.5 per cent to about 10 per cent by weight of this aluminum soap, based on the weight of the oily liquid, and preferably between about 3 per cent and 6 per cent, produces a gel within the aforesaid time interval, which is suitable for fracturing most formations when prepared at temperatures of about 75° F. or above. Soaps produced from cobalt and particularly aluminum combined with a fatty acid produce suitable bodying agents for the oily liquids. The fatty acid employed is preferably one having at least 12 carbon atoms, suitable examples of which are coconut oil fatty acids, peanut oil fatty acids, palm oil fatty acids, stearic acid, oleic acid, palmitic acid, and the like.

The oily liquid or "base liquid" employed in the preparation of such gels may be selected from a relatively wide range of materials. Thus, in addition to crude oil, kerosene, and gasoline, we may employ an animal oil such as lard oil or fish oil, a vegetable oil such as cotton seed oil, chlorinated hydrocarbons, or the like. The expression "base liquid," appearing in certain of the appended claims is to be construed as being any oily liquid from which satisfactory fracturing gels can be prepared and includes the group of operative compounds listed immediately above.

The gel accelerators which may be utilized in the process of our invention comprise a rather large group of compounds and as examples of materials suitable for this purpose there may be mentioned carbon disulfide, oleic acid, linoleic acid, the aromatic hydrocarbons of the benzene series such as, for example, benzene, toluene, and the xylenes, and the like. The gelling action of these compounds varies both with respect to the materials themselves and with respect to the base liquid from which the gel is to be derived. Thus when 6 weight per cent of a mixture of aluminum soaps consisting of 50 per cent aluminum laurate, 25 per cent aluminum oleate, and 25 per cent aluminum naphthtenate is added to a mixture of 25 parts of benzene and 75 parts of East Texas crude oil, a gel is formed within one-half hour at 33° F., which possesses all of the characteristics required of a satisfactory fracturing gel for the majority of the formations to be fractured. In the absence of benzene a gel from the aforesaid crude oil and bodying agent cannot be formed at a temperature below 80° F. Carbon disulfide in mixtures of this type is approximately 75 per cent as effective as benzene, while results comparable to those obtained with benzene may be secured by utilizing about 5 parts of oleic acid in place of 25 parts of benzene. Also, when lighter hydrocarbons such as kerosene, gasoline, or similar relatively light hydrocarbon mixtures are employed instead of crude oil or similar mixtures, less accelerator is ordinarily required to produce a gel having the desired properties. In general, with benzene as the accelerator, satisfactory gels can be prepared by using that compound in a concentration of from about 5 volume per cent to about 25 volume per cent based on the total volume of accelerator and base liquid employed. For comparable results with carbon disulfide as the accelerator, an additional 5 to 10 volume per cent is required over that recommended for benzene. On the other hand, the unsaturated acids employed, such as oleic acid, are approximately five times as active as the hydrocarbon accelerators such as benzene; accordingly, to produce results similar to those obtained with 5 to about 25 volume per cent of benzene, we need employ only from about 1 to about 5 volume per cent of oleic acid or linoleic acid. In this connection it should be pointed out that while higher quantities of accelerator bring about more rapid gelation of the fracturing liquid, they also cause a more rapid breakdown of the gel. Therefore, concentrations of accelerator appreciably above the top limits given herein are generally to be avoided.

To further illustrate the ability of the aforesaid accelerators to cause gelation of typical base liquids under conditions previously considered unsatisfactory, there is given in the table which follows the quantity of benzene required to produce a suitable fracturing gel, having the composition indicated, within one-half hour at the temperature specified. The bodying agent was employed in a concentration of 6 weight per cent and was composed of 25 per cent aluminum naphthenate, 25 per cent aluminum oleate, and 50 per cent aluminum laurate.

*Table*

| Temp., °F. | Percent by vol. East Texas crude oil | Percent by vol. gasoline | Percent by vol. benzene |
| --- | --- | --- | --- |
| 80 | 100 | | |
| 70-80 | 75 | 25 | |
| 70-80 | 95 | | 5 |
| 60-70 | 50 | 50 | |
| 60-70 | 90 | | 10 |
| 45-60 | 80 | | 20 |
| 33-45 | 75 | | 25 |

Satisfactory gels were also prepared from the same base mixture under similar conditions with oleic acid and carbon disulfide, using these accelerators in the concentration ranges recommended above for oleic acid and carbon disulfide.

Although mixtures of aluminum palmitate with base liquids such as gasoline or crude oil produce satisfactory gels, such mixtures normally must be heated to relatively high temperatures to induce gel formation. For example, when this particular aluminum soap is employed (in concentrations of 6 weight per cent) together with crude oil, the resulting mixture must be heated to a temperature of the order of 110° F. before a gel having the desired characteristics is produced. We have found, however, that if 5 weight per cent of aluminum palmitate is added to 75 parts of crude oil and 25 parts of benzene, a satisfactory gel is produced at 75° F. within one-half hour. Also, in the preparation of gels from aluminum palmitate and gasoline, it is necessary to heat the mixture of these two ingredients to a temperature slightly above 100° F. before a suitable gel is produced. However, we have found that a very satisfactory gel can be produced at a temperature as low as 80° F. from a mixture consisting essentially of about 5 weight per cent aluminum palmitate in gasoline if 3 volume per cent of oleic acid is added thereto.

From the foregoing description it will be apparent that the present invention constitutes a distinct advance in the preparation of fracturing gels. Likewise, it will be evident to those skilled in the art that numerous modifications in the procedure set forth above may be made without departing from the scope of our invention. For example, in some instances, mixtures of the various accelerators may be employed to advantage or with the same efficiency as exhibited by a single gel accelerator. Also, other combinations of base liquids and bodying agents other than those specifically mentioned may be advantageously employed. Moreover, while the present invention has been described specifically with respect to the applicability of benzene, carbon disulfide, and oleic acid as gel accelerators for the hydraulic fracturing compositions contemplated herein, it is to be strictly understood that our invention is not limited thereto but, on the contrary, it is intended to cover the broad idea of converting mixtures of bodying agents and base liquids, which cannot normally be converted into satisfactory gels without heating, into suitable hydraulic fracturing compositions by the addition of a substance which functions to accelerate the gelation of such mixtures.

What we claim is:

1. A method for effecting gelation of a base liquid containing a metal soap bodying agent to form a reversible fracturing gel which comprises adding to the mixture of base liquid and bodying agent a material which accelerates gelation of said mixture, said material being selected from the group consisting of carbon disulfide and a hydrocarbon of the benzene series.

2. A method for reducing the temperature at which gelation occurs in a reversible fracturing gel consisting essentially of a base liquid containing an aluminum soap bodying agent which comprises adding thereto a material which accelerates gelation of the mixture of base liquid and aluminum soap bodying agent, said material being selected from the group consisting of carbon disulfide and a hydrocarbon of the benzene series.

3. The process of claim 2 in which the aluminum soap bodying agent is present in a concentration of from about 0.5 weight per cent to about 10 weight per cent and in which the accelerator is employed in a concentration of from about 1 volume per cent to about 35 volume per cent.

4. A method for effecting gelation of a base liquid containing an aluminum soap bodying agent which comprises adding from about 5 to about 25 volume per cent of a hydrocarbon of the benzene series to the mixture of base liquid and bodying agent.

5. The method of claim 4 in which benzene is the hydrocarbon employed.

6. A composition of matter having increased gelling tendencies prepared by adding to crude oil containing from about 0.5 to about 10 weight per cent of a bodying agent consisting essentially of 50 per cent aluminum laurate, 25 per cent aluminum naphthenate, and 25 per cent aluminum oleate, from about 5 to about 25 volume per cent of benzene which functions as a gel accelerator for said crude oil.

7. A composition of matter having increased gelling tendencies prepared by adding to kerosene containing from about 0.5 to about 10 weight per cent of a bodying agent consisting essentially of 50 per cent aluminum laurate, 25 per cent aluminum naphthenate, and 25 per cent aluminum oleate, from about 5 to about 25 volume per cent of benzene which functions as a gel accelerator for said kerosene.

8. In the preparation of a reversible gel suitable for use in fracturing underground formations, the step which comprises adding a gel accelerator selected from the group consisting of carbon disulfide and a hydrocarbon of the benzene series to a mixture comprising essentially a base liquid containing an aluminum soap bodying agent, said mixture ordinarily being incapable of forming a gel at temperatures below 60° F.

9. In the preparation of a reversible gel suitable for use in fracturing underground formations, the step which comprises adding from about 1 volume per cent to about 35 volume per cent of a gel accelerator selected from the group consisting of carbon disulfide and a hydrocarbon of the benzene series to a mixture comprising essentially a base liquid and an aluminum soap bodying agent consisting of about 25 per cent aluminum oleate, 25 per cent aluminum naphthenate, and about 50 per cent aluminum laurate.

10. A method for reducing gelation temperature of a base liquid containing a bodying agent consisting of about 25 per cent aluminum oleate, 25 per cent aluminum naphthenate, and about 50 per cent aluminum laurate, which comprises adding to said base liquid from about 5 to about 25 volume per cent of benzene.

11. The process of claim 9 in which the base liquid employed is crude oil.

12. The process of claim 9 in which the base liquid employed is kerosene.

13. In the preparation of a reversible gel suitable for use in fracturing underground formations, the step which comprises adding as a gel accelerator from about 10 to about 35 volume per cent of carbon disulfide to a mixture comprising essentially a base liquid containing an aluminum soap bodying agent.

14. A reversible fracturing gel having initially increased gelling tendencies prepared by adding to a base liquid containing from about 0.5 to about 10 weight per cent of a metal soap bodying agent, from about 1 to about 35 volume per cent of a gel accelerator for said base liquid, said gel accelerator being selected from the group consisting of carbon disulfide and a hydrocarbon of the benzene series.

15. The composition of claim 14 in which the gel accelerator is a hydrocarbon of the benzene series and is present in said composition to the extent of from about 5 to about 25 volume per cent.

16. The process of claim 2 in which the accelerator employed is a hydrocarbon of the benzene series.

17. The process of claim 8 in which the gel accelerator employed is a hydrocarbon of the benzene series.

References Cited in the file of this patent

UNITED STATES PATENTS

| Number | Name | Date |
|---|---|---|
| 1,752,935 | Wyler | Apr. 1, 1930 |
| 2,343,736 | Beerbower et al. | Mar. 7, 1944 |
| 2,380,893 | Zimmer et al. | July 31, 1945 |
| 2,383,906 | Zimmer et al. | Aug. 28, 1945 |
| 2,386,805 | Laliberte | Oct. 16, 1945 |
| 2,492,173 | Mysels | Dec. 27, 1949 |
| 2,521,395 | Morway et al. | Sept. 5, 1950 |
| 2,606,107 | Fieser | Aug. 5, 1952 |